(12) United States Patent
Na et al.

(10) Patent No.: US 8,266,925 B2
(45) Date of Patent: *Sep. 18, 2012

(54) APPARATUS FOR MANUFACTURING FLOAT GLASS

(75) Inventors: Sang-Oeb Na, Seoul (KR); Yang-Han Kim, Goyang-si (KR); Hyung-Young Oh, Goyang-si (KR); Young-Sik Kim, Seoul (KR); Won-Jae Moon, Seoul (KR); Kil-Ho Kim, Suwon-si (KR); Heui-Joon Park, Incheon (KR); Chang-Hee Lee, Osan-si (KR)

(73) Assignee: LG Chem, Ltd., Seoul (KR)

( * ) Notice: Subject to any disclaimer, the term of this patent is extended or adjusted under 35 U.S.C. 154(b) by 268 days.

This patent is subject to a terminal disclaimer.

(21) Appl. No.: 12/705,225

(22) Filed: Feb. 12, 2010

(65) Prior Publication Data

US 2010/0206010 A1   Aug. 19, 2010

(30) Foreign Application Priority Data

Feb. 13, 2009   (KR) .................. 10-2009-0011980

(51) Int. Cl.
*C03B 18/16* (2006.01)
*C03B 18/18* (2006.01)

(52) U.S. Cl. ........................................ 65/182.3; 65/99.4

(58) Field of Classification Search .................. 65/182.3
See application file for complete search history.

(56) References Cited

U.S. PATENT DOCUMENTS

| | | | | |
|---|---|---|---|---|
| 3,317,301 A | * | 5/1967 | Robinson | 65/99.3 |
| 3,525,601 A | * | 8/1970 | Mobuyoshi | 65/168 |
| 3,860,406 A | * | 1/1975 | Basler et al. | 65/91 |
| 4,012,216 A | * | 3/1977 | Marchand | 65/99.3 |
| 4,092,140 A | * | 5/1978 | Cerutti et al. | 65/99.3 |
| 4,116,661 A | * | 9/1978 | Edge et al. | 65/182.3 |
| 4,138,239 A | * | 2/1979 | Nier et al. | 65/182.3 |
| 4,548,636 A | * | 10/1985 | Nomaki et al. | 65/99.2 |
| 4,940,479 A | * | 7/1990 | Sato et al. | 65/99.2 |

FOREIGN PATENT DOCUMENTS

| | | |
|---|---|---|
| JP | 45-30711 | 10/1970 |
| JP | 2000-128552 | 5/2000 |

* cited by examiner

*Primary Examiner* — Matthew Daniels
*Assistant Examiner* — Cynthia Szewczyk
(74) *Attorney, Agent, or Firm* — McKenna Long & Aldridge LLP

(57) ABSTRACT

An apparatus for manufacturing a float glass, including a float bath for storing a molten metal on which a molten glass flows, wherein the molten metal flows in the float bath, comprises an discharge opening formed through a wall of a downstream end of the float bath at the center of the wall to discharge a molten metal crashing against the wall and dross floating on the molten metal; and a pair of side channels formed inside of the wall and communicated with the discharge opening and both sides of the float bath.

9 Claims, 5 Drawing Sheets

APPARATUS FOR MANUFACTURING FLOAT GLASS

CROSS-REFERENCE TO RELATED APPLICATION

This application claims priority to Korean Patent Application No. 10-2009-0011980 filed in Republic of Korea on Feb. 13, 2009, the entire contents of which are incorporated herein by reference.

BACKGROUND OF THE INVENTION

1. Field of the Invention

The present invention relates to an apparatus for manufacturing a float glass, and more particularly, to an apparatus for manufacturing a float glass using a float glass process.

2. Description of the Related Art

Generally, an apparatus for manufacturing a float glass (also known as a sheet glass, a flat glass or a plate glass) using a float glass process is used to manufacture a continuous sheet of glass having a ribbon shape of a predetermined width by continuously supplying a molten glass onto a flowing molten metal (a molten tin and so on) stored in a float bath while floating the molten glass on the molten metal to form a molten glass ribbon reaching around an equilibrium thickness due to the surface tension and gravity, and pulling up the molten glass ribbon toward an annealing lehr near an exit of the float bath.

Here, the molten metal includes, for example, a molten tin or a molten tin alloy, and has a greater specific gravity than the molten glass. The molten metal is received in a float chamber where a reducing atmosphere of hydrogen ($H_2$) and/or nitrogen ($N_2$) gas is introduced. The float bath in the float chamber is configured to contain the molten metal therein. The float bath has a horizontally extending structure, and includes a high heat resistant material (for example, bottom blocks) therein. The molten glass forms a molten glass ribbon on the surface of the molten metal while moving from an upstream end of the float bath to a downstream end. The molten glass ribbon is lifted up at a location set on the downstream end of the float bath, so called a take-off point, to be removed from the molten metal, and delivered to an annealing lehr of a next process.

However, because the molten metal in the float chamber is in a high-temperature state (for example, about 600 to 1100° C.), chemical reactions take place among the molten metal, the molten glass, $H_2$ and $N_2$ of the atmosphere, a very small amount of $O_2$, $H_2O$ and S to generate impurities that are referred to as "dross". In particular, temperature is lower at and around the take-off point on the downstream end (Cold End) of the float bath than the upstream end (Hot End). Thus, solubility of the molten metal decreases on the downstream end, and consequently, metal oxide dross, for example $SnO_2$, etc. is liable to happen and accumulate on the downstream end. When the molten glass ribbon is lifted up from the take-off point, the dross is attached to the bottom of the molten glass ribbon and drawn from the float bath, accompanied by the molten glass ribbon. As a result, it causes scratch, stain and so on that may unfavorably influence a subsequent process and/or the quality of float glass products.

To solve the problems, various techniques have been developed so far. For example, as disclosed in Japanese Patent Publication No. SO45-30711, a conventional apparatus for manufacturing a float glass includes a collecting channel having an approximately T-shaped pocket of which a plane expands slightly in a widthwise direction by a side wall and a rear wall of a longitudinal end portion of a float bath. The collecting channel is formed at a predetermined angle so that dross gathered in the collecting channel from an exposed drainage area can be guided to the pocket. The dross is discharged from the pocket outside the float bath.

As disclosed in Japanese Patent Laid-open Publication No. 2000-128552, another conventional apparatus for manufacturing a float glass includes a first flow channel extending in a cross direction with respect to a draw-out direction of the float glass, and a second flow channel connected to an end of the first flow channel and communicated with a dam starting from the outside of a side wall. The apparatus flows back a molten metal from a downstream end of a float bath to an upstream end through separate flow channels.

However, these conventional techniques remove dross, which was caused by contamination in a float bath, at both sides of a downstream end of the float bath. However, the conventional techniques have difficulty in removing dross accumulated under the center of a molten glass ribbon at the downstream end, and to remove such dross, it should open a side sealing with a separate strap-shaped tool made of wood. Under this operational environment, when the side sealing is open, the float bath may be further contaminated and safety in operation may be not guaranteed. As a result, it may deteriorate the quality of float glass products and the procedural stability.

SUMMARY OF THE INVENTION

The present invention is designed to solve the above-mentioned problems, and therefore it is an object of the present invention to provide an improved apparatus for manufacturing a float glass, which has a discharge opening formed at the center of a 'lip block' located at a downstream end among floor blocks of a float bath, and a pair of side channels communicated with the discharge opening and the sides of the float bath, so that the flow of a molten metal is guided from the center of the float bath to the sides of the float bath, thereby stably removing dross floating on the molten metal.

To achieve the object, an apparatus for manufacturing a float glass according to the present invention, including a float bath for storing a molten metal on which a molten glass flows, wherein the molten metal flows in the float bath, comprises a discharge opening formed through a wall of a downstream end of the float bath at the center of the wall to discharge a molten metal crashing against the wall and dross floating on the molten metal; and a pair of side channels formed inside of the wall and communicated the discharge opening and both sides of the float bath.

Preferably, the apparatus of the present invention further comprises a guide member for guiding the dross to the discharge opening.

Preferably, the guide member has a round portion formed at an inlet of the discharge opening.

Preferably, the guide member has a tapered guide wall slanted inward from both edges of the wall toward the discharge opening located at the center of the wall.

Preferably, the guide member has a funnel-shape discharge opening of which an outlet has a smaller width than an inlet.

Preferably, the apparatus of the present invention further comprises a heating unit arranged at the corresponding side channel for heating the molten metal flowing through the side channels.

Preferably, the heating unit has a heater.

Preferably, the apparatus of the present invention further comprises a circulation member for generating a back flow of the molten metal and the dross in the discharge opening and the side channels by applying a traveling magnetic field to the molten metal.

Preferably, the circulation member has a linear motor.

EFFECTS OF THE PRESENT INVENTION

The apparatus for manufacturing a float glass according to the present invention effectively flows back dross (impurities) accumulated at and near the center of a lip block located at a downstream end of a float bath toward both sides of the float bath, thereby improving the quality of float glass products and ensuring the procedural stability.

BRIEF DESCRIPTION OF THE DRAWINGS

The accompanying drawings illustrate the preferred embodiments of the present invention and are included to provide a further understanding of the spirit of the present invention together with the detailed description of the invention, and accordingly, the present invention should not be limitedly interpreted to the matters shown in the drawings

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
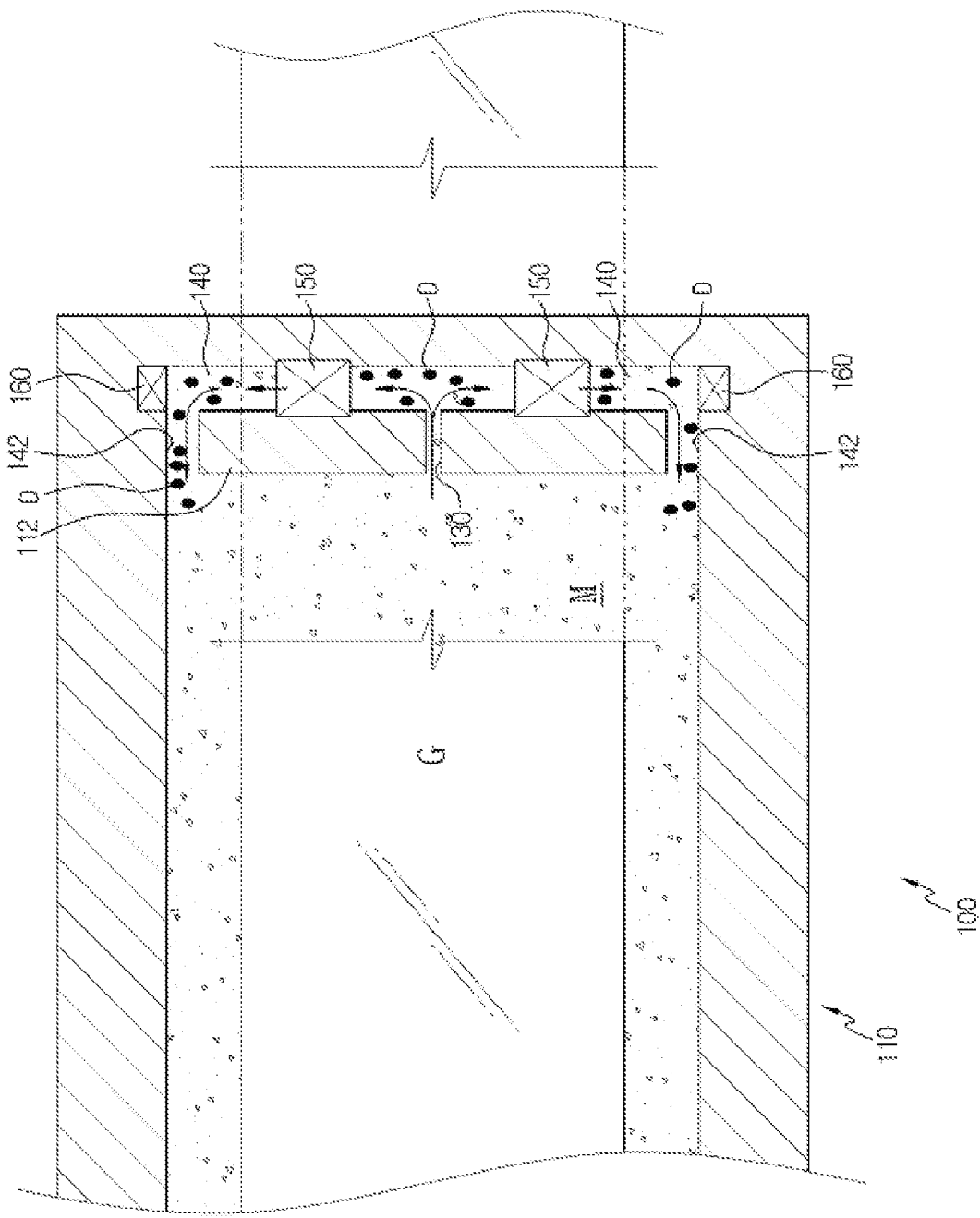
FIG. 1 is a schematic plan view of an apparatus for manufacturing a float glass according to a preferred embodiment of the present invention.
Figure 2:
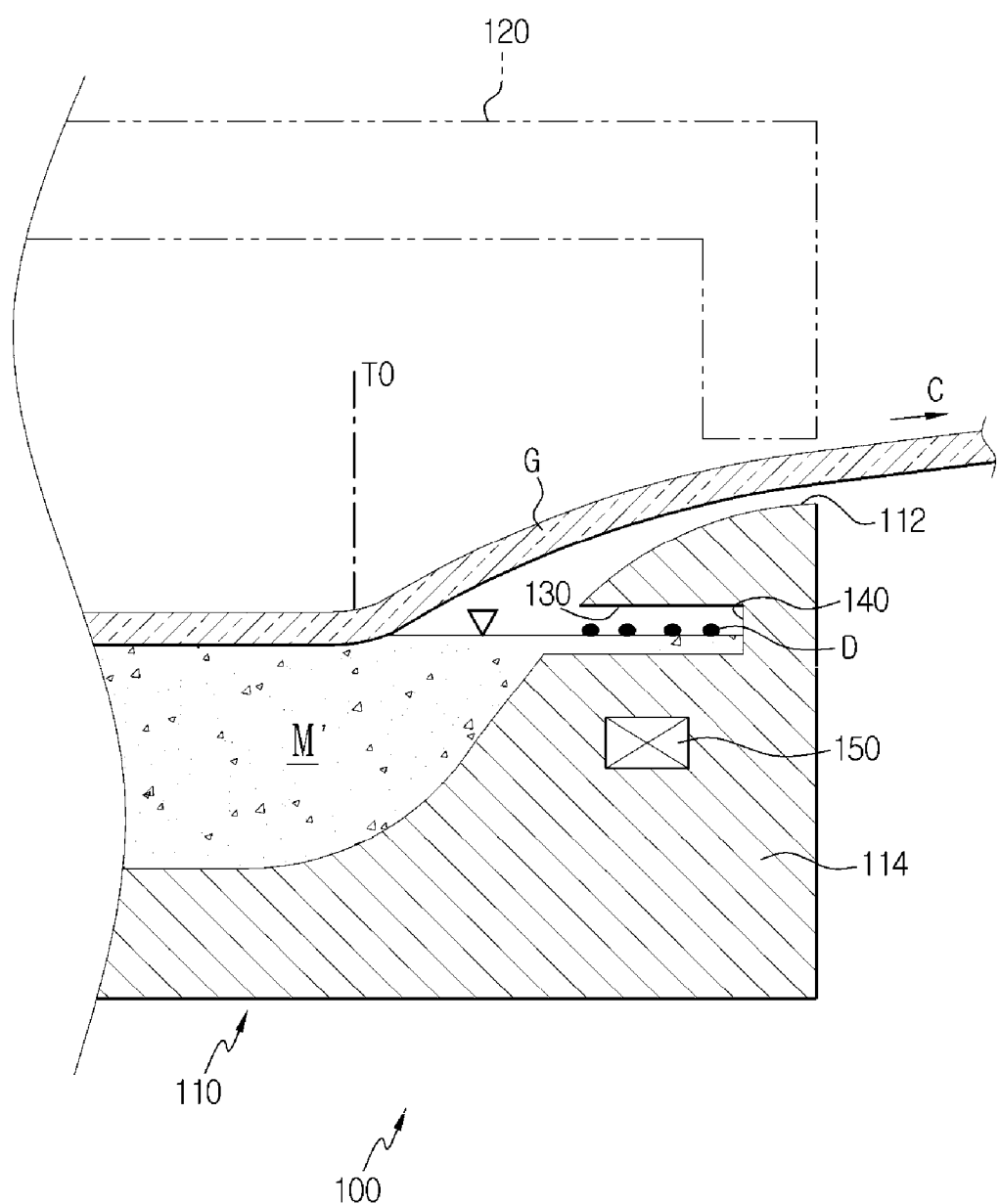
FIG. 2 is a side view of FIG. 1.

FIG. 1 is a schematic plan view of an apparatus for manufacturing a float glass according to a preferred embodiment of the present invention. FIG. 2 is a side view of FIG. 1.

Referring to FIGS. 1 and 2, the apparatus 100 for manufacturing a float glass according to an embodiment of the present invention is configured to manufacture a float glass using a so-called float glass process. The apparatus 100 includes a float chamber, and the float chamber has a float bath 110 located at a lower portion thereof and a roof 120 covering the top of the float bath 110. The float chamber is an airtight type that has an input port (not shown) and an output port 112.

The float bath 110 stores a molten metal (M) such as a molten tin, a molten tin alloy and so on. The molten metal (M) is supplied from an upstream end of the float bath 110 (shown at the left side of the drawing) and moves to a downstream end (shown at the right side of the drawing) by a molten glass (G). The molten metal (M) flows from the upstream end of the float bath 110 to the downstream end due to a temperature gradient in the float bath 110, and at the same time, flows from the center of the float bath 110 to both sides of the float bath 110. The temperature gradient is a difference in temperature between the downstream end and the upstream end which is maintained at a relatively higher temperature. The molten glass (G) also flows from the upstream end of the float bath 110 to the downstream end, and is pulled upwards at a take-off point (TO) to be removed from the surface of the molten metal (M) and then drawn out toward an annealing Lehr (not shown) of a next process (See arrow C).

The atmosphere in the float chamber is formed by a mixed gas of nitrogen and hydrogen. The mixed gas is maintained at pressure slightly higher than the external atmosphere, and the molten metal (M) and a ribbon of the molten glass (G) are maintained at about 800 to 1300° C. by an electric heater (not shown). The molten glass (G) is a nonalkaline glass, a soda-lime glass, and so on. The principle and structure for flow generation of the molten metal (M) in the float bath 110, and input, ribbonization, movement and discharge of the molten glass (G) are well known in a typical float glass process, and the detailed description is omitted herein.

The float bath 110 has a discharge opening 130 and a pair of side channels 140. The discharge opening 130 is formed through a wall of the downstream end, or a lip block 114 at the center of the lip block 114. The side channels 140 are formed substantially parallel to the widthwise direction of the float bath 110.

The discharge opening 130 is configured to discharge the molten metal (M) crashing against the center of the lip block 114 that is a wall of the downstream end, and dross that may float on the molten metal (M). The discharge opening 130 has a predetermined size corresponding to a predetermined length of the lip block 114. That is, the discharge opening 130 is formed to have a predetermined width and a cross section in the shape of a rectangle, a square or a circle, however the present invention is not limited in this regard. The discharge opening 130 may have various shapes, and in particular, the discharge opening 130 has preferably a linear shape leading to a certain location substantially parallel to a traveling direction of a float glass.

The side channels 140 communicate with the discharge opening 130, and are formed inside of the lip block 114 substantially parallel to the widthwise direction of the float bath 110 so as to flow back the molten metal (M) and impurities or dross (D) flown in through the discharge opening 130 toward both sides of the float bath 110. And, each of the side channels 140 has a side hole 142 communicated with an end thereof. The side hole 142 is also communicated with each opposing side of the float bath 110.

The discharge opening 130 and the pair of side channels 140 may be formed by modifying the lip block 114 and piping to the modified lip block, or may be designed and formed from the beginning.

In an alternative embodiment, the apparatus of the present invention may further comprise a circulation member 150 for flowing the molten metal (M) discharged through the discharge opening 130 to the side channels 140.

The circulation member 150 is configured to generate a back flow of the molten metal (M) and the dross (D) in the discharge opening 130 and the side channels 140 by applying a traveling magnetic field to the molten metal (M) flown in through the discharge opening 130. Typically, the circulation member 150 has a linear motor. The linear motor of the circulation member 150 may be provided with an arbitrary number on the surface of the molten metal (M), or at the side, the bottom or other locations in the discharge opening 130 and/or the side channels 140 of the float bath 110. The circulation member 150 having the linear motor can directly drive the molten metal (M) in a noncontact manner, and thus it has an advantage of easy flow control. The linear motor generates a traveling magnetic field in a predetermined direction by forming a comb-shaped primary coil around a core, applying a three-phase alternating current voltage to the coil, and magnetizing the coil. The generated traveling magnetic field provides a driving force to the molten metal (M). The flow control of the molten metal (M) may be preset before operation of the apparatus for manufacturing a float glass or may be set in the middle of producing a glass after operation of the apparatus for manufacturing a float glass according to necessity.

When the linear motor operates to excite the traveling magnetic field, a flow back of the molten metal (M) is generated in the discharge opening 130 and the side channels 140. That is, the molten metal (M), on which dross (D) may float, passes through the discharge opening 130 from the downstream end, moves along the side channels 140 and flows back to both sides of the float bath 110 through the side holes 142.

Therefore, according to the preferred embodiment of the present invention, it can prevent dross (D) from staying at and around the take-off point (TO), in particular, at the center of the molten glass (G), thereby reducing a defect rate of float glass.

Meanwhile, the dross (D) floating on the molten metal (M) may be collected by a collecting means (not shown). The collecting means may be provided near the discharge opening 130 or the side channels 140 or at both sides of the downstream end of the float bath 110. Here, the collecting means may include, for example, an equipment for decomposing dross (D) by heating the molten metal (M), an equipment for separating dross (D) by cooling the molten metal (M), mechanically capturing the separated dross (D) and physically removing the captured dross (D), and so on.

According to the preferred embodiment of the present invention, the apparatus 100 for manufacturing a float glass may further comprise heating units 160. The heating units 160 are arranged at the corresponding side channels 140 to increase the temperature of the molten metal (M) that was cooled while flowing along the side channels 140. The heating units 160 may be an electric heater, and are configured to solve the problem that an unnecessary gas may be produced due to the decreased temperature of the molten metal (M) at the downstream end of the float bath 110.

In the above-mentioned embodiment, the lip block 114 denotes a wall that is substantially perpendicular to the widthwise direction of the float bath 110 and has a linear arrangement. In alternative embodiments, various modifications may be conceived to discharge impurities such as dross (D) existing at the downstream end of the float bath 110 more effectively.

Figure 3:
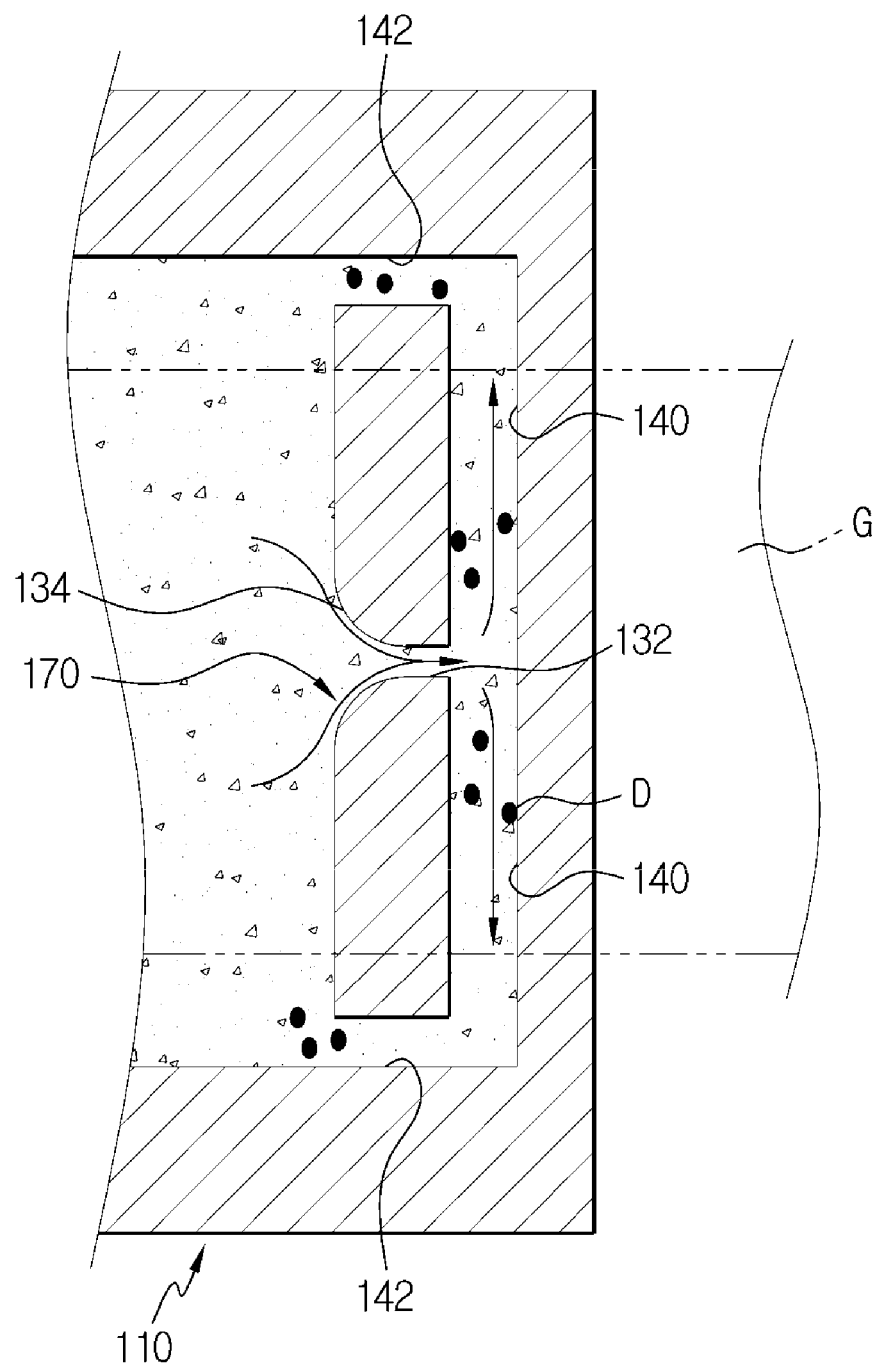
FIGS. 3 to 5 are view of a guide member according to each embodiment of the present invention, illustrating modification of a lip block or a discharge opening, respectively.
Figure 4:
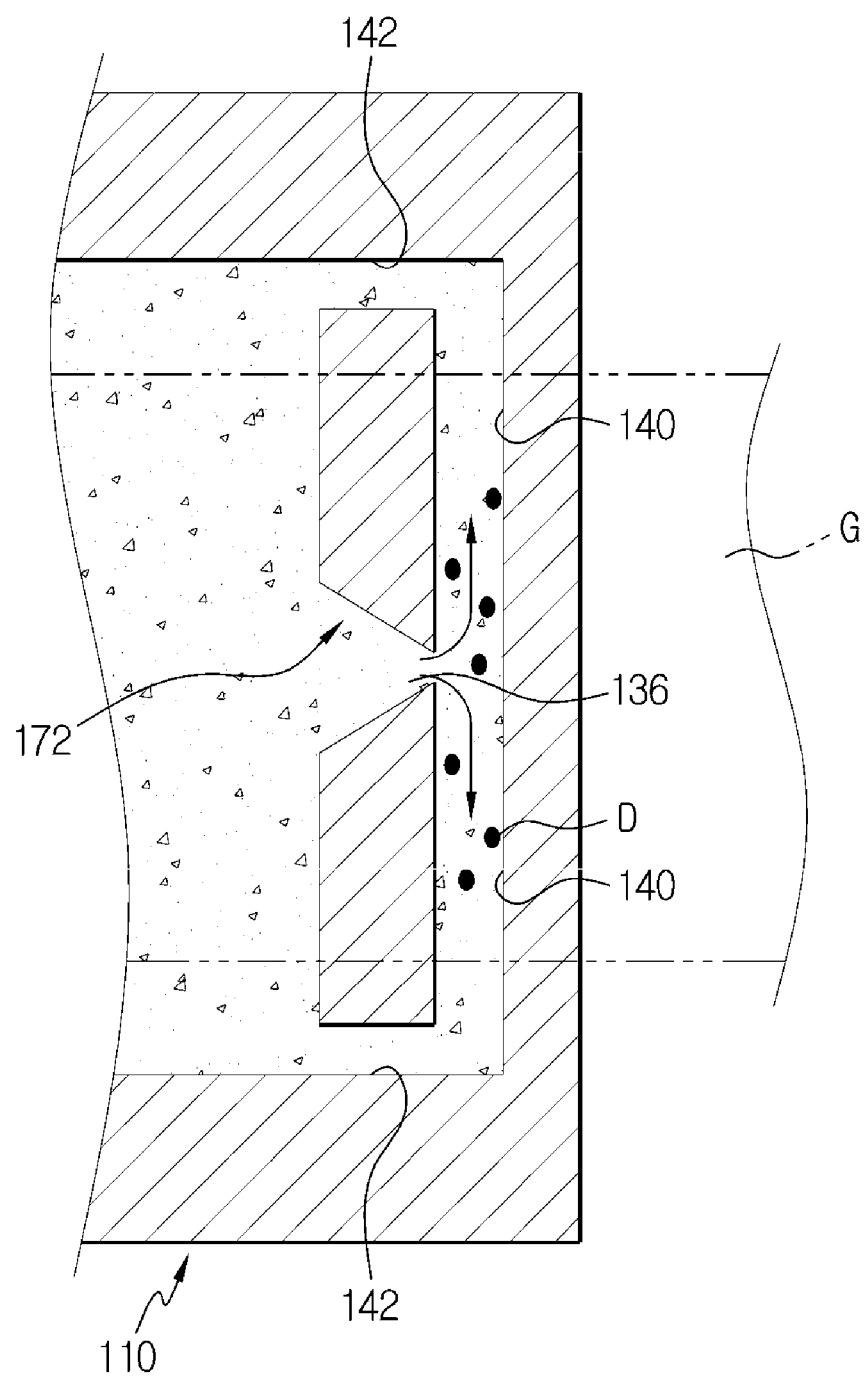
Figure 5:
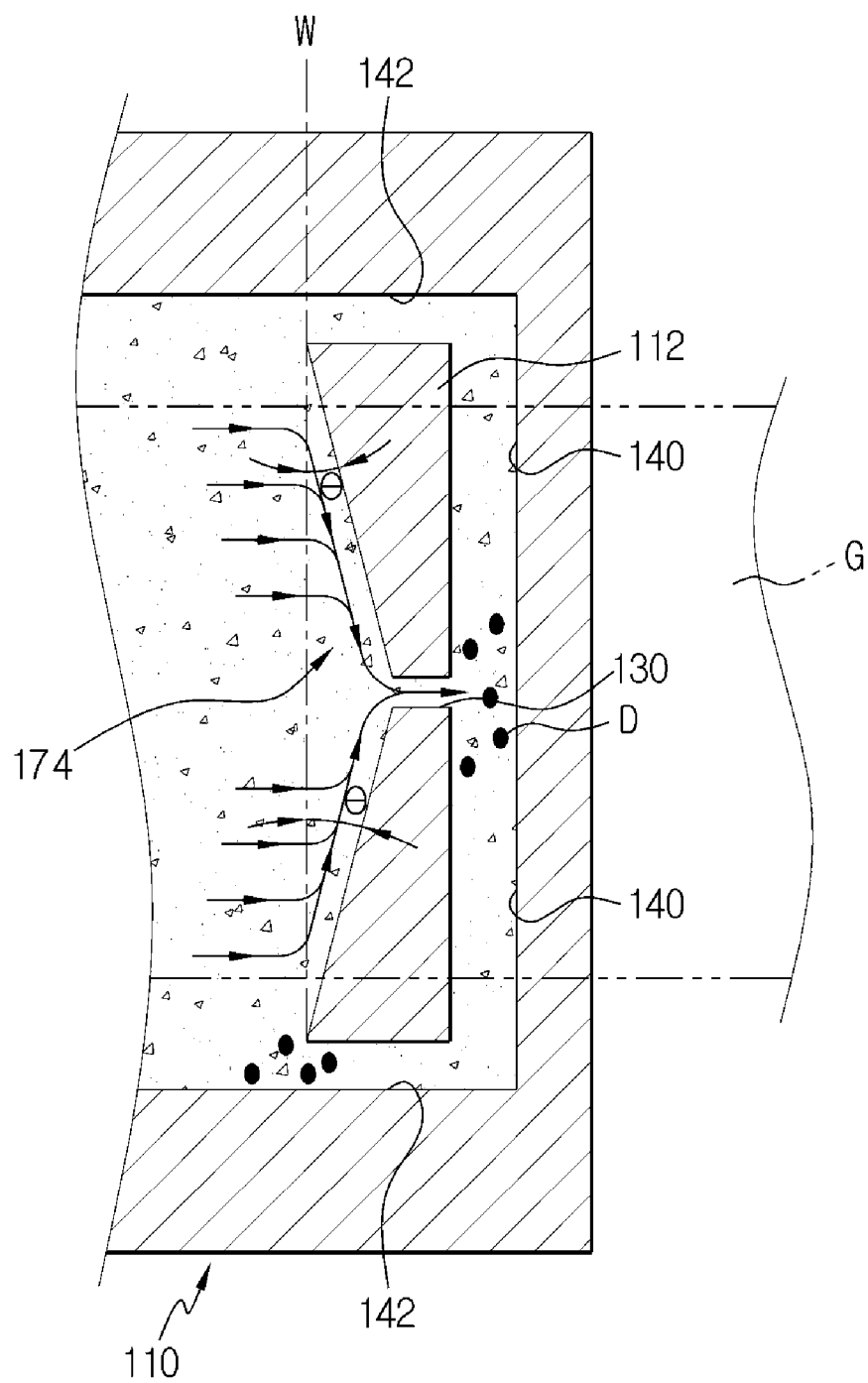

FIGS. 3 to 5 are views of a guide member according to each embodiment of the present invention, illustrating modifications of a lip block or a discharge opening, respectively. The same reference numerals as FIGS. 1 and 2 indicate the same elements of the same functions.

As shown in FIG. 3, an apparatus for manufacturing a float glass according to an alternative embodiment of the present invention further comprises a guide member 170. The guide member 170 has a round portion 134 formed at an inlet of a discharge opening 132. The round portion 134 has a predetermined curvature, whereby the inlet of the discharge opening 132 is larger than an outlet of the discharge opening 132. This round inlet of the discharge opening 132 provides guide function and operation for easier discharge of dross (D) through the discharge opening 132 than an angled inlet of the discharge opening 132.

As shown in FIG. 4, according to another alternative embodiment of the present invention, a guide member 172 has a funnel-shaped discharge opening 136 of which an outlet has a smaller width than an inlet. The funnel-shaped discharge opening 136 facilitates the discharge of dross (D) due to the changes in flow rate with varying the width of an inlet and an outlet of the discharge opening 130 in a similar way to the round portion 134 of the above-mentioned embodiment.

As shown in FIG. 5, according to still another alternative embodiment of the present invention, a guide member 174 has a tapered guide wall slanted inward from the opposing edges of the lip block 114 toward the discharge opening 130 located at the center of the lip block 114. This tapered guide wall allows for the molten metal (M) to flow therealong toward the discharge opening 130 after the molten metal (M) crashes against the lip block 114 at the downstream end of the float bath 110. This tapered configuration provides a wall of the downstream end slanted at a predetermined angle ($\theta$) with regard to the widthwise direction (W) of the float bath 110.

Meanwhile, the present invention is not limited to the above-mentioned embodiments, and proper modifications and improvements may be made thereto. And, it is possible to arbitrarily select the material, shape, size, type, number, location, etc. of the float bath, the molten metal, the molten glass, the take-off point, the discharge opening, the side channels, the circulation member, etc. within the ranges to achieve the object of the present invention, however the present invention is not limited in this regard.

As mentioned above, the apparatus for manufacturing a float glass according to the present invention flows back the molten metal toward both sides of the float bath through the discharge opening and the side channels using the circulation member. Accordingly, it can prevent dross on the molten metal from staying at the downstream end of the float bath and reduce a defect rate of float glass.

Hereinabove, the present invention is described with reference to the limited embodiments and drawings. However, the description proposed herein is just a preferable example for the purpose of illustrations only, not intended to limit the scope of the invention, so it should be understood that other equivalents and modifications could be made thereto without departing from the spirit and scope of the invention.

What is claimed is:

1. An apparatus for manufacturing a float glass, including a float bath for storing a molten metal on which a molten glass flows, the molten metal flowing in the float bath, the apparatus comprising:
   a discharge opening formed through an end wall of a downstream end of the float bath at the center of the end wall so as to discharge a molten metal crashing against the end wall and dross floating on the molten metal through the discharge opening thereby prohibiting an attachment of the dross into the float glass; and
   a pair of side channels formed inside of the end wall substantially parallel to the widthwise direction of the float bath and communicated with the discharge opening and both sides of the float bath.

2. The apparatus for manufacturing a float glass according to claim 1, further comprising: a guide member for guiding the dross near the end wall to the discharge opening.

3. The apparatus for manufacturing a float glass according to claim 2, wherein the guide member has a round portion formed at an inlet of the discharge opening.

4. The apparatus for manufacturing a float glass according to claim 2, wherein the guide member has a tapered guide wall slanted inward from both edges of the end wall toward the discharge opening located at the center of the end wall.

5. The apparatus for manufacturing a float glass according to claim 2, wherein the guide member has a funnel-shaped discharge opening of which an outlet has a smaller width than an inlet.

6. The apparatus for manufacturing a float glass according to claim 1, further comprising:

a heating unit arranged at the corresponding side channel for heating the molten metal flowing through the side channel.

7. The apparatus for manufacturing a float glass according to claim 6, wherein the heating unit has a heater.

8. The apparatus for manufacturing a float glass according to claim 1, further comprising:

a circulation member for generating a back flow of the molten metal and the dross in the discharge opening and the side channels by applying a traveling magnetic field to the molten metal.

9. The apparatus for manufacturing a float glass according to claim 8, wherein the circulation member has a linear motor.

* * * * *